(12) United States Patent
Dodge (10) Patent No.: US 7,818,210 B2
(45) Date of Patent: Oct. 19, 2010

(54) METHOD FOR PLAYING KENO WITH INCREASED PLAYER INTEREST

(75) Inventor: Clifford B. Dodge, Billings, MT (US)

(73) Assignee: Gametech International, Inc., Reno, NV (US)

( * ) Notice: Subject to any disclaimer, the term of this patent is extended or adjusted under 35 U.S.C. 154(b) by 179 days.

(21) Appl. No.: 11/471,703

(22) Filed: Jun. 20, 2006

(65) Prior Publication Data

US 2007/0117611 A1    May 24, 2007

Related U.S. Application Data

(60) Provisional application No. 60/738,116, filed on Nov. 18, 2005.

(51) Int. Cl.
    *A63F 9/24* (2006.01)
(52) U.S. Cl. .............. 705/16; 705/17; 705/18; 705/19; 705/20
(58) Field of Classification Search .......... 463/16, 463/17, 18, 19, 20
    See application file for complete search history.

(56) References Cited

U.S. PATENT DOCUMENTS

| | | | | |
|---|---|---|---|---|
| 4,756,531 A | * | 7/1988 | DiRe et al. ................ | 463/18 |
| 5,401,024 A | * | 3/1995 | Simunek .................. | 463/18 |
| 5,651,735 A | * | 7/1997 | Baba ....................... | 463/18 |
| 5,935,001 A | * | 8/1999 | Baba ....................... | 463/18 |
| 6,386,975 B1 | * | 5/2002 | Peterson .................. | 463/16 |
| 6,679,495 B1 | * | 1/2004 | Endelicato ............... | 273/269 |
| 6,702,669 B2 | * | 3/2004 | Moody .................... | 463/18 |
| 2002/0173353 A1 | * | 11/2002 | Thomas ................... | 463/17 |
| 2003/0017867 A1 | * | 1/2003 | deKeller .................. | 463/18 |
| 2003/0064797 A1 | * | 4/2003 | Jackson et al. ........... | 463/25 |

* cited by examiner

*Primary Examiner*—Pierre E Elisca
(74) *Attorney, Agent, or Firm*—Dillon & Yudell LLP (57) ABSTRACT

A novel Keno game is disclosed in which additional bonus numbers are randomly chosen and displayed in addition to twenty numbers randomly picked for game play. When there are a first predetermined number of matches between the additional bonus numbers and the random twenty numbers the player is awarded a bonus, and the type is bonus is identified by a selection made by the player. The type of bonus is printed out on a bonus ticket that is dispensed to the player. In a subsequent round of Keno game play a player is prompted to insert certain types of bonus ticket if there is a second predetermined number of matches between the additional bonus numbers and the twenty random numbers the player is prompted to insert into the Keno game machine types of bonus tickets that they hold. When the player inserts a bonus ticket it is read and retained and a subsequent round of Keno game play is modified according to the type of bonus identified.

8 Claims, 5 Drawing Sheets

A – 3 free games
B – free game award multiplier
C – instant award multiplier
D – Bonus Bucks

A – 3 free games
B – free game award multiplier
C – instant award multiplier
D – Bonus Bucks

METHOD FOR PLAYING KENO WITH INCREASED PLAYER INTEREST

CROSS REFERENCE TO RELATED APPLICATION

This patent application claims rights under 35 U.S.C. 119 (e) from U.S. provisional patent application number 60/738,116, entitled "A Method For Playing Keno With Increased Player Interest", and filed Nov. 18, 2005.

FIELD OF THE INVENTION

This invention generally relates generally to video gaming machines and more particularly to an interactive keno-style game.

BACKGROUND OF THE INVENTION

Conventional Keno is a well known game. There are eighty numbers in a pool-typically eighty keno balls numbered 1 through 80 and maintained in an air blower device that circulates the Keno balls. Twenty of the eighty Keno balls are selected each round of game play.

Each player has a Keno ticket that is an 8×10 matrix with the eighty numbers printed thereon. Each player marks their ticket with between one and fifteen of the eighty numbers that the player thinks will be drawn during the game. The player also makes an appropriate wager. Depending on the number of matches between the twenty numbers drawn and the numbers selected and marked by the player on their play card, the player wins or loses. The more matching numbers there are the higher the payoff to the player.

In electronic Keno, a single player plays against a computer controlled video gaming machine for each round of game play and the player either wins or loses each round. No other players are involved. At the beginning of game play the player selects between one and ten numbers and wagers one or more coins, tokens or credits. The computer of the video gaming machine randomly selects twenty numbers from a pool of eighty numbers and then compares the twenty numbers to the player selected numbers to determine if the player has achieved a winning payout for the round of game play. The player selections are made by using a light pen, pressing numbered buttons on a selection panel, or by touching numbers displayed on-screen using conventional video touch screen technology.

In the typical video Keno format, the player may select between one and ten numbers to attempt to match the randomly selected numbers. When the player presses a "Start" button, the computer of the video gaming machine randomly selects twenty numbers from the total pool of eighty numbers. Just as in live Keno, the player has winnings based on how many of their selected numbers match the randomly selected twenty numbers. The player's winnings are greater as there are more matches. If the player matches less than the predetermined minimum number of selected numbers, the player loses.

Keno games, alike other wagering games are more successful, when players are provided with a sense of participation and control, the opportunity to make decisions, reasonable odds of winning, and what the players perceive is an improved chance to beat the odds that are normally in favor of a casino or game owner.

Over time gaming patrons become bored with standard versions of games, including Keno, and game owners are continually looking for new variations of the games to create renewed interest and to attract more players to play the games.

It would therefore be advantageous to have a new Keno game which is similar to conventional Keno games but which provides for greater player interaction with the game, and which would appear to provide greater opportunities for winning. Such a new Keno game would stimulate renewed interest of experienced players, and the interest of casual players, who will experience new excitement with the new interactive Keno game.

SUMMARY OF THE INVENTION

The present invention combines the most desirable elements of conventional Keno games with a novel improvement that gives greater player interaction with the game, and appears to provide greater opportunities for winning. This stimulates renewed interest of experienced players and increased interest of casual players, who will experience new excitement with the new Keno game.

The novel improvement is added to a standard computer controlled video Keno game where a player initially selects between two and ten numbers to play from a pool of eighty numbers in manner well known in the Keno art by touching between two and ten of the eighty numbers displayed on a video screen equipped with touch screen technology. All eighty numbers are displayed in an 8×10 matrix and the player selected play numbers are highlighted in some manner in the matrix as in the prior art. The player also initially places a wager as in the prior art.

Upon the player touching a Start button the game computer randomly selects and displays twenty game play numbers from the pool of eighty numbers in a manner known in the Keno art. The twenty numbers are displayed on or adjacent to the 8×10 matrix. The number of matches between the player selected numbers and the twenty numbers randomly selected by the game computer determines the player's winnings according to a pay table in a manner well known in the art.

In accordance with the teaching of the present invention, at the time the game computer randomly selects the twenty game play numbers it also randomly selects three additional "bonus numbers".The bonus numbers are displayed along with the ten numbers selected by the player at the start of game play.

When there are matches of two or all three of the bonus numbers randomly selected by the game computer and ones of the twenty game play numbers selected by the game computer, the game implements extra steps in accordance with the teaching of the present invention. A new group of ten blocks are displayed on the game video screen. Each block has a randomly selected one of a group of bonuses associated therewith. The player touches one of the ten blocks to receive an indication of a type of bonus they have received. The game computer causes a game printer to print and dispense to the player a ticket with alphanumeric printing and a bar code thereon indicating the particular type of bonus the player has received.

There are four possible types of bonuses. The first type of bonus is a predetermined number of free games. The second type of bonus is a free game award multiplier where any winnings the player receives while playing only bonus free games are increased by a predetermined multiplier. The third type of bonus is an instant award multiplier where all displayed payouts in the game pay table are multiplied until the player achieves a winning combination and receives a multiplied payout. The fourth type of bonus is a predetermined number of bonus bucks that the player is awarded. When the player uses a bonus bucks ticket they are taken to a new display screen on which is displayed a different game, which for example may be a horse race. The player picks a horse or horses to win, place or show and places bets on them. The race is run and the player receives winnings if the horse(s) win, place or show as bet by the player. The horse race game then terminates and the display screen returns to the Keno game.

The four types of bonuses described above are not exclusive. Many other types of bonus arrangements may be substituted or added, or the types described above may vary. For example, a second game other than a horse race may be invoked with a bonus bucks ticket.

In response to the player's bonus selection by touching one of the ten displayed bonus blocks, a thermal printer that is part of the game hardware prints out and dispenses a bonus ticket with alpha-numeric information and a bar code printed thereon. The alpha-numeric information and bar code indicate the type of bonus the player has received in response to their bonus selection.

During rounds of game play the player will sometimes have all three game computer selected bonus numbers match ones of the twenty game play numbers. At that time the player will preferably be prompted to insert any bonus ticket they have previously received and subsequent rounds of Keno game play and their winnings will be altered per the type of bonus ticket. In addition, at the end of the present round of game play another bonus ticket will be printed and dispensed to the player for use during a subsequent round of Keno game play.

In an alternative embodiment of the invention bonus tickets may be utilized at any time independent of bonus number matches. A player may also insert bonus tickets at various times, such as before the start of a round of game play, or between rounds of game play, to avail themselves of the bonus indicated on a ticket.

If the player has no previously issued bonus ticket before they have a match of all three bonus numbers they are automatically awarded a fixed number of free games and a fixed award multiplier for those free games.

DESCRIPTION OF THE DRAWINGS

The invention will be better understood upon reading the following Detailed Description in conjunction with the drawing in which.

DETAILED DESCRIPTION

Briefly, The present invention combines the most desirable features of existing Keno games with a novel improvement that gives a player more sense of participation and control, the opportunity to make decisions, reasonable odds of winning, and what the players perceive is a chance to beat odds that are normally in favor of a casino. The result is a more desirable Keno game that includes bonuses that may be awarded to a player during game play, and the bonuses affect Keno game play. The Keno game is played on a video gaming machine equipped with touch screen operation. The use of touch screen technology with gaming machines is well known in the video gaming art. As specific locations on a video screen are touched during game play the touch is sensed by a game computer 45 (FIG. 8) and appropriate game action is taken as is described hereinafter. In accordance with the teaching of the invention, during each round of Keno game play an event may occur that causes a player to be awarded a bonus which is printed on a ticket that is dispensed to the player. The player utilizes the bonus tickets during subsequent rounds of Keno game play to get the benefit of the bonus, which may yield increased winnings or permit subsequent free play of a predetermined number of rounds of a different type of game.

Figure 1:
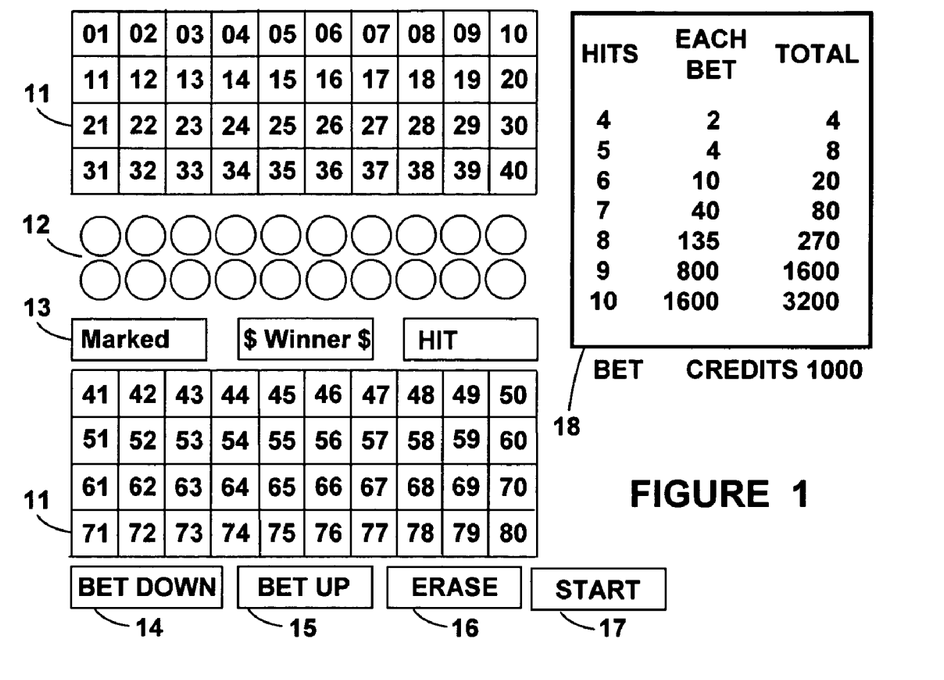
FIG. 1 shows the display screen of a conventional video Keno game used in implementing the present invention.
Figure 2:
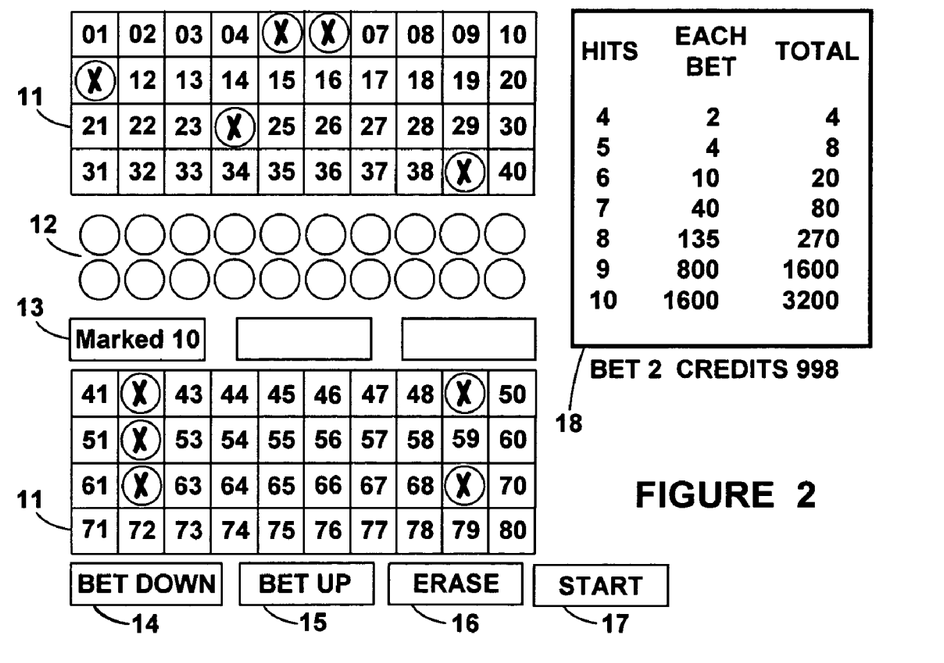
FIG. 2 shows the display screen of FIG. 1 with ten numbers selected by a player to be played in a round of Keno game play.
Figure 3:
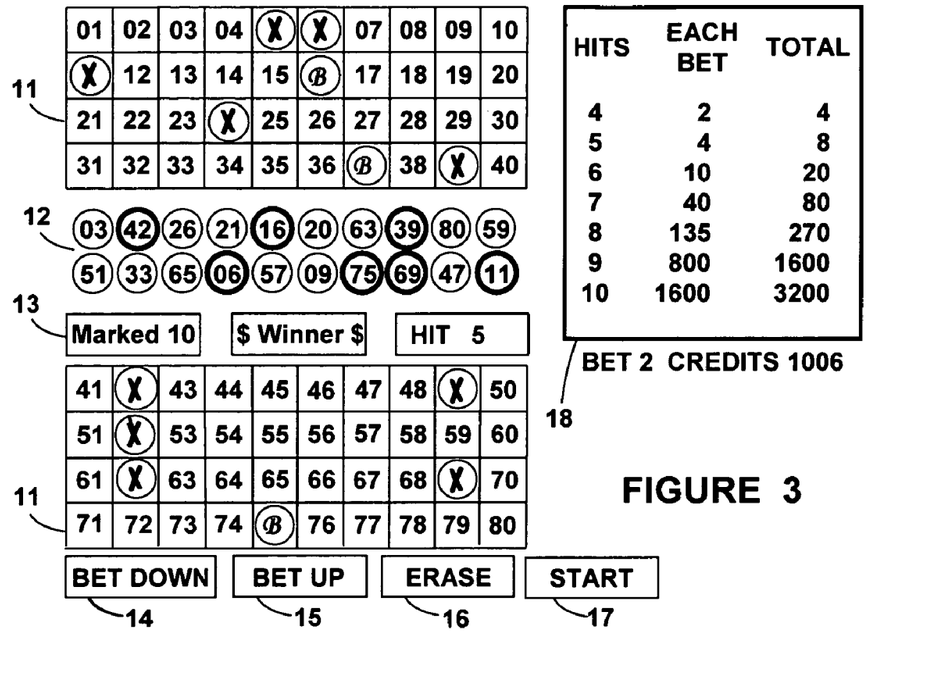
FIG. 3 shows, for one round of game play, twenty game play numbers randomly selected by the game computer in a conventional manner, the ten numbers selected by a player, three bonus numbers selected by the game computer that are used during game play to give a player a chance to win game bonus options that can yield additional winnings, and the number of matches between the twenty computer selected numbers and the three bonus numbers that can yield winnings to the player.
Figure 4A:
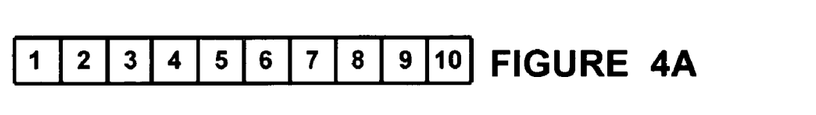
FIG. 4A shows a block of ten numbers displayed after there is a match of at least two of the twenty computer selected numbers and the three bonus numbers during a round of game play.
Figure 4B:
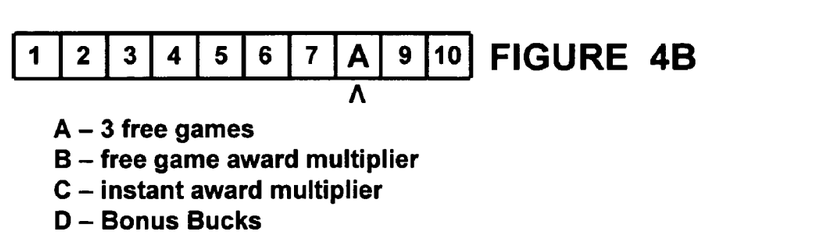
FIG. 4B shows what bonus a player receives responsive to selecting one of the ten numbers in FIG. 4A.
Figure 5:
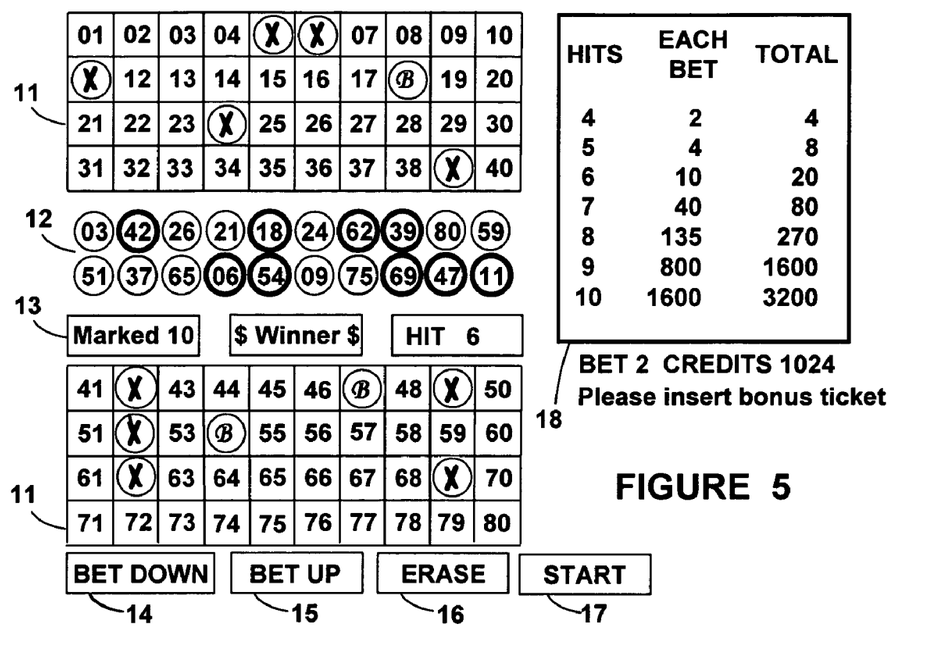
FIG. 5 shows, for a second round of game play, twenty game play numbers randomly selected by the game computer in a conventional manner, the ten numbers selected by a player, three bonus numbers selected by the game computer that are used during game play for a player to win bonus options, the number matches between computer selected numbers and player selected numbers, and bonus number matches.

In FIG. 1 is shown a Keno game display screen on which the present invention is implemented as shown in more detail in FIGS. 3, 4 and 5. There is an 8×10 matrix 11 of numbers from 1 to 80, hereinafter called "matrix 11", from which a player selects up to ten numbers to be played during a round of Keno game play after one or more bets have been placed on a round of game play. The numbers are selected by the player touching the display screen at the location of selected numbers. The touch screen senses the touch and the player selected play numbers are marked by an "X" in a circle as shown in FIG. 2. There is also a field 12 of twenty positions indicated by circles, hereinafter called "display field 12", in which are displayed twenty numbers randomly selected by the game computer during game play. In FIG. 3 is shown a first round of Keno game play with the twenty numbers randomly selected by the game computer being displayed. In FIG. 5 is shown a second round of Keno game play with the twenty numbers randomly selected by the game computer being displayed. Matches between player selected numbers, game computer selected numbers and bonus numbers are indicated in dark circles in display field 12 as shown in FIGS. 3 and 5.

There is a display field 13 consisting of a row of three blocks in FIGS. 1 in which are indicated various game indicia.

The first block is entitled "Marked" and in this block is indicated the quantity of between one and ten numbers a player selects and marks for a round of Keno game play by touching positions in matrix 11. If a player selects ten numbers to be played that block will appear as "Marked 10" as shown in FIGS. 2, 3 and 5.

There is a second block in display field 13 entitled "Hit" in which is indicated the number of number matches between the up to ten player selected numbers marked by an X in matrix 11 and the twenty numbers randomly selected by the computer and displayed in display field 12 as shown in FIGS. 3 and 5. In FIG. 3 there are a total of five matches between the ten player selected numbers and the twenty randomly selected numbers in display field 12 so this block reads "HIT 5". In FIG. 5 there are a total of six matches between the ten player selected numbers and the twenty randomly selected numbers in display field 12 so this block reads "HIT 6". The player's game winnings are determined from pay table 18 in a manner well known in the art.

Pay tables are well known in the art. Pay table 18 changes automatically to take into account the quantity of numbers, between two and ten, selected by the player to be played for each round of Keno game play and the number of bets the player has placed on the round of game play. The number of credits that may be won by a player for each bet that they place on a round of game play and for the number of hits or number matches is shown in pay table 18 under the column entitled "Each Bet". In FIG. 3 and 5 the player has picked ten numbers and placed two bets/credits on the first and second rounds of Keno game play as shown in these Figures. Taking ten selected numbers and two placed bets into account the players possible winnings are then shown under the column entitled "Total" in pay table 18. For the placement of two bets the possible winnings are twice that shown in the Each Bet column. Similarly, for three bets the winnings would be three times that shown in the Each Bet column. Thus, for the two rounds of Keno game play shown in FIGS. 3 and 5, where the player has placed two bets on each of those rounds of game play, if they have five number matches or hits, they win eight credits; and if they have four number matches or hits they win four credits.

There is a third block in display field 13 entitled "$Winner$" that indicates when a player is a winner at a round of Keno game play. The $Winner$ block will typically flash when the player is a winner and the visual display may be accompanied with sounds such as buzzer or a bell. The various displays in the row of blocks 13 will change during game play as numbers are selected by the player, and after determining if the player has any winnings for a round of game play.

At commencement of game play, to place bets the player touches "Bet Up" button 15 once for each bet they wish to place on a round of game play, up to some maximum number of bets. In the two examples of Keno game play described herein with reference to FIGS. 3 and 5, two bets are placed on each round of game play as indicated by "BET 2" under pay table 18 in these two Figures. If the player wishes to decrease their number of their bets they touch "Bet Down" button 14, once for each reduction in the number of bets they wish to place on the round of Keno game play. Keno games may also have a Bet Max button (not shown) which a player may touch to quickly place some maximum number of bets. This button is not shown to keep the drawings as simple as possible.

After one or more bets have been placed a player selects up to ten numbers to play from the numbers displayed in 8×10 matrix 11. This is done by touching ones of the eighty numbers in matrix 11. The video screen is equipped with touch screen technology to sense what numbers are touched. Numbers that are touched disappear and are replaced by an "X" in a circle as may be seen in FIGS. 2, 3 and 5. A player may deselect a number by re-touching the number and the X will disappear. Once ten numbers have been touched and the X displayed, touching additional numbers will not cause them to have an X displayed in their position in matrix 11. If the player wishes to reselect all the numbers, they touch "Erase" button 16. All Xs displayed in matrix 11 disappear and the player may select different numbers to play by touching a new set of numbers in matrix 11. In between rounds of Keno game play the player may wish to change all their player selected numbers for the next round of game play. They may touch Erase button 17 to remove all Xs and then reselect up to ten new numbers.

There is typically provided an indication of the total number of bets that a player is placing on a round of Keno game play. This is shown underneath pay table 18 in FIGS. 3 and 5 as "BET". Also displayed is the number of credits that a player has to play and this is shown in FIG. 1 as "CREDITS 1000" underneath pay table 18. That number is decremented during each round of game play by the number of bets that the player places the round of game play, and is incremented by any winnings that a player receives as shown in FIGS. 2, 3 and 5. Pay table 18 indicates the number of credits that a player will win for each bet depending on the number of hits during a round of game play as previously described.

Other standard features of a Keno video game that are well known in the prior art are deliberately not shown in FIGS. 1-3 and 5 to avoid detracting from the teaching of the present invention and to avoid cluttering the drawing. Typically there is a slot for inserting coins or tokens for placing a number of wagers or bets for a round of game play. This is shown as element 47 in FIG. 8. In addition, there may be a slot for the insertion of a debit card from which the game software debits the number of wagers or bets placed by a player during each round of Keno game play, and to which the game software credits any credit winnings. This is also shown as element 47 in FIG. 8. Also, if there is a slot for insertion of coins or tokens there will be a tray into which winnings in the form of coins or tokens are dispensed. This is shown as element 49 in FIG. 8. The video screen display 10 will also typically display information such as, but not limited to, copyright and trademark notices, manufacturer of equipment, name of game, and fancy graphics.

Figure 8:
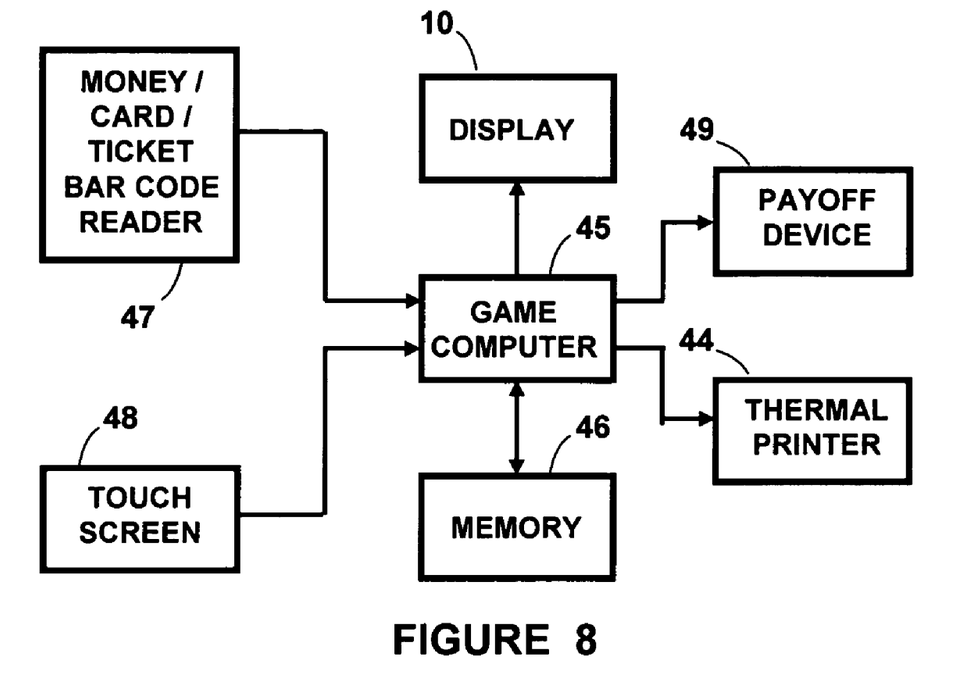
FIG. 8 shows a general block diagram of the video gaming system used to the Keno game including the present invention.

At the beginning of the first round of game play the player inserts a debit card, on which is stored an indication of a number of betting credits the player has, into card reader 47 (FIG. 8). The insertion of the debit card indicates to game computer 45 the start of some number of rounds of game play by the player who has inserted the card. The game computer clears the Keno video display 10 to remove numbers displayed in display field 12 and player selected numbers in matrix 11 from previous game play. The numbers displayed in the blocks in display field 13 are also removed. The number of credits displayed under pay table 18 is changed to display the number of credits stored on the player's debit card. For the two examples described herein the player is assumed to have 1000 credits at the start of game play and the number 1000 is displayed under pay table 18 as "Credits 1000" as shown in FIG. 1. The number of bets placed and displayed under pay table 18 is also set to zero. The player is now ready to play the first round of Keno game play.

For the first round of game play the player first places some number of bets (credits) by using Bet Up button 15. The player touches button 15 twice to place two bets. In FIG. 2 this is indicated as "Bet 2" being displayed and the player's credit total on the debit card being reduced by two with "Credits 998" being displayed. After a player has placed a bet Start button 17 appears on display screen 10 adjacent Erase button 16.

The player then commences touching anywhere from two to ten of the numbers displayed in matrix 11 to select those numbers for game play. For both rounds of game play described herein the player selects ten numbers and they are the same set of numbers for both games. In FIGS. 2, 3 and 5 these ten numbers are shown as the X in circle in lieu of the numbers 05, 06, 11, 24, 39, 42, 49, 52, 62 and 69. After the player is finished selecting and touching numbers they touch Start button 17.

In accordance with the teaching of the invention, after Start button 17 is touched the game computer 45 (FIG. 8) then randomly selects three bonus numbers from amongst the eighty numbers in matrix 11 that haven't been selected by the player. In FIG. 3 the three bonus numbers for the first round of game play are 16, 37 and 75. These are shown as the three numbers overwritten with a "B" in a circle in FIGS. 3 and 5. After the three bonus numbers are displayed the game computer randomly selects twenty numbers that are displayed in display field 12.

Game computer 45 (FIG. 8) then performs two number comparisons. The computer compares the ten player selected numbers marked with an X in 8×10 matrix 11 with the twenty randomly selected numbers displayed in display field 12 to determine any standard Keno game winnings from pay table 18. The computer also compares the three bonus numbers randomly selected by the game computer and marked with a "B" in matrix 11 with the twenty randomly selected numbers displayed in display field 12 to determine if the player is to receive a bonus. If there are at least two matches between these two sets of numbers the player will receive a bonus and the computer displays a group of ten blocks numbered 1-10 on the game video screen as shown in FIG. 4A. Each of these ten blocks is associated with a bonus award. The player touches one of the ten blocks on the touch sensitive screen of display 10 to receive an indication of what type of bonus they have received as shown in FIG. 4B. Four types of bonuses are described herein but other types and additional types of bonuses may be used. The player does not know ahead of time what bonus is associated with each of the ten blocks and the assignment of the bonuses to the ten blocks changes each time the ten blocks are displayed.

In FIG. 4B the player has selected the number 8 by touching it and the number 8 changes to the letter "A". From the list that is displayed under the ten numbers immediately after the player touches a number, as shown in FIG. 4B, the player receives a bonus of three free games of Keno. If the player had selected and touched a number that had the letter "B" associated therewith the player would have received as a bonus a free game award multiplier. If the player had selected and touched a number that had the letter "C" associated therewith the player would have received as a bonus an instant award multiplier. If the player had selected and touched a number that had the letter "D" associated therewith the player would have received as a bonus some number of Bonus Bucks. These bonuses are described in greater detail in subsequent paragraphs.

The game computer 45 (FIG. 8) then causes a thermal printer 44 (FIG. 8) to print and dispense to the player a ticket with alphanumeric printing and a bar code thereon indicating the particular type of bonus the player has received responsive to their number selection in FIG. 4B. For the first game example the ticket will indicate that the player has received three free games of Keno.

The first type of bonus is a predetermined number of free games (three in this case) that the player receives. The bonus is used by inserting a previously received free game bonus ticket into ticket bar code reader 47 (FIG. 8) to be read and verified against an issued ticket data base following a number match of all three bonus numbers. The bonus ticket doesn't affect the present round of Keno game play but a number of subsequent rounds of Keno game play are free as indicated on the ticket. Ticket bar code reader 47 reads and retains the bonus ticket. The free rounds of game play may or may not include the bonus number feature during free game play.

The second type of bonus is a free game award multiplier where any winnings the player receives while playing free bonus games are increased by a predetermined multiplier as indicated on the bonus ticket. This second type of bonus is used by inserting a free game bonus ticket, when and as described in the previous paragraph, and a free game award multiplier bonus ticket into bar code reader 47 (FIG. 8) to be read and verified against an issued ticket data base. Reader 47 reads and retains both the bonus tickets. The multiplier indicated on the free game award multiplier ticket applies to any winnings a player receives while playing any of the rounds of free Keno game play. For example, the bonus ticket may indicate that any winnings be doubled or tripled.

The third type of bonus is an instant award multiplier. To utilize this third type of bonus, the player inserts into bar code reader 47 (FIG. 8) a bonus ticket indicating they have an instant award multiplier following a number match of all three bonus numbers. Game computer 45 reads and retains the bonus ticket and applies the multiplier indicated on the bonus ticket to rounds of Keno game play the player subsequently plays until the player receives a winning combination of four or more numbers matches between the player selected numbers and the twenty randomly selected numbers. That award is multiplied and the multiplier is then extinguished. While the instant award multiplier is in effect the entries in the Total column in pay table 18 is changed to reflect the multiplied winnings. For example, if the player has five number matches with two bets and normally would win eight credits and the instant award multiplier on the bonus ticket is three, the player wins a total of twenty-four credits. The number twenty-four will be displayed in the pay table in the row for 5 hits.

The fourth type of bonus is a predetermined number of Bonus Bucks that the player is awarded. When the player inserts a Bonus Bucks ticket into ticket bar code reader 47 (FIG. 8) they will preferably do it following a number match of all three bonus numbers. Bar code reader 47 in conjunction with game computer 45 reads, verifies and retains the bonus ticket. After the present game of Keno play is terminated, and before a subsequent round of Keno game play is started, game computer 4 causes the Keno game play screen to disappear and a new screen is displayed to play a different type of game. For example, a horse race game may appear. The player is permitted to choose a horse or horses, place bets on them using the Bonus Bucks, and the horse race is run. The player will receive winnings based on the race results.

If a player has no previously issued bonus ticket before they have a match of all three bonus numbers this is recognized by the computer. The computer then awards the player a fixed number of free games and a fixed award multiplier for those free games.

The four types of bonuses described above are not exclusive. Many other types of bonus arrangements may be substituted or added, or the bonus types described above may be varied. The bonus bucks ticket may be used for something other than playing a game other than Keno or a different bonus bucks game. Variations of when bonus tickets may be used and what combinations thereof may be played may be different. For example, bonus tickets may be inserted at any time and not just following a number match of all three bonus numbers. The important aspect is that bonus tickets are printed and are utilized by a player at a later time to get the benefit of the bonuses indicated on the tickets which may yield increased winnings or permit subsequent free play of a predetermined number of rounds of a different type of game.

More particularly, as shown in FIG. 3, during the first round of Keno game play the player selects up to ten numbers to play. For the first round of Keno game play the selected numbers are 05, 06, 11, 24, 39, 42, 49, 52, 62 and 69 in matrix 11, and the numbers are indicated by replacing each of them with an "X" in a circle. These ten player selected numbers are used in the examples of the novel Keno game described herein.

When the player has placed one or more bets and is finished selecting up to ten numbers they touch Start button 17 and game play continues. The selected numbers and the bet can no longer be changed. Game computer 45 (FIG. 8) first randomly selects and displays the three bonus numbers in matrix 11. They will be different than the player selected numbers. In this first round of game play the bonus numbers are 16, 37 and 75 and each is displayed as a "B" in a circle in 8×10 matrix 11 as shown in FIG. 3. Then game computer 45 (FIG. 8) randomly selects and displays the twenty numbers shown in display field 12. For this first round of game play they are 03, 42, 26, 21, 16, 20, 63, 39, 80, 59, 51, 33, 65, 06, 57, 09, 75, 69, 47 and 11.

In the next step of game play the game computer 45 performs two comparisons. It first compares the ten player selected numbers in matrix 11 with the twenty numbers randomly selected by the game computer and displayed in display field 12 to determine any Keno game winnings. In the first round of game play shown in FIG. 3 there are five number matches for the numbers 42, 39, 06, 69 and 11. The winnings are determined using pay table 18 with the number of number matches and the number of bets placed at the beginning of game play. In the first round of game play there are five matches as listed above and, per pay table 18, with two bets placed the player wins eight credits. The player started the first round of game play with 1000 credits and placed two bets for two credits, leaving 998 credits as shown in FIG. 2. Having now won eight credits the player's new credit total is 1006 credits as shown in FIG. 3.

The game computer 45 next compares the three bonus numbers 16, 37 and 75 with the twenty randomly selected numbers in display field 12 to determine if any bonuses are to be awarded to the player. The player has won a bonus because there are at least two number matches. In the first round of game play shown in FIG. 3 there are matches for the two bonus numbers 16 and 75.

Matches between these sets of numbers may be displayed in many ways on a video gaming machine but with the restriction of the drawing they are shown in bold circles. The number matches are shown as a dark circle around the number. To distinguish between player selected number matches and bonus number matches, the bonus number matches, if any, blink while the player selected number matches are lit steady. In the drawing they are all shown with a dark circle around them.

Responsive to the two bonus number matches the game computer 45 causes the row of ten numbers shown in FIG. 4A to appear on the video screen 10 underneath blocks 14 through 17. The size and type of bonuses that may be awarded may be different between a match of two bonus number and three bonus numbers.

There are four types of bonuses and they are randomly assigned to the ten numbers in FIG. 4A in the following manner. At the start of each round of Keno game play the game computer randomly selects one of the letters A through D to be displayed behind each of the numbers 1 through 10 in each of the ten blocks shown in FIG. 4A. As described above upon there being either two or three numbers matches of the three bonus numbers 16, 37 and 75 with the twenty randomly selected numbers in display field 12 the row of ten numbers are displayed. The player selects and touches one of the ten number blocks. The touch is recognized by the touch screen and the associated circuitry and software, and the display changes to that shown in FIG. 4B. The number that has been touched disappears to display the previously randomly selected letter assigned to it. In FIG. 4B the number 8 has been touched by the player and the number 8 is replaced by the letter A. At the same time that the letter A is displayed in FIG. 4B, under the ten numbered blocks is displayed a description of each of the four possible bonuses and each is associated with one of the letters A through D. The bonus options have previously been described. There may be more than or fewer than four types of bonuses.

In this first example of game play the letter A is the letter randomly associated with the number 8 and the player is awarded three free games of Keno. The game computer 45 (FIG. 8) controls thermal printer 44 (FIG. 8) to print and dispense to the player a bonus ticket with alphanumeric printing and a bar code thereon indicating that the player has been awarded a bonus of three free games of Keno. The first round of Keno game play is completed. The player may immediately continue into a second round of game play or may quit play. At some later time the player may again commence Keno game play and utilize any bonus tickets they hold at that time. To do this game computer 45 (FIG. 8) must be tied to a central computer that keeps track of bonus tickets issued and to whom.

A player is only prompted by the game computer to use their bonus tickets during a subsequent round of Keno game play when all three randomly selected bonus numbers in matrix 11 match ones of the twenty randomly selected numbers if display field 12. If there are no bonus number matches, or only one or two bonus number matches, the player is not prompted on display screen 10 to insert a bonus ticket into ticket bar code reader 47. However, if there are at least two bonus number matches the player will receive another bonus ticket. In this first round of game play there are only two bonus numbers matches for the numbers 16 and 75 so the player is not prompted to insert a bonus ticket into ticket bar code reader 47 (FIG. 8) to receive a bonus, but is issued a bonus ticket. A player, at their option, may use any bonus ticket they hold when they are so prompted. This gives the player a feeling that they have some control in the game play. When a ticket is inserted into ticket bar code reader 47 it is read, verified and retained in reader 47 for subsequent disposal. Game computer 45 responds to what information is read off an inserted bonus ticket to modify a subsequent round of Keno game play.

This is the end of the first round of Keno game play and the player has been awarded a bonus ticket for three free games of Keno. The player then progresses to play a second round of Keno game play as shown in FIG. 5. Again the player wishes to place two bets as shown under field 18. The player may change their bet by touching on-screen Bet Down button 14 or Bet Up button 15. Confirmation that the player is repeating their previous bet level is received when the player touches Start button 17 after possibly changing some or all of the player selected numbers in matrix 11.

In the second example of Keno game play the player selects and touches the ten numbers 05, 06, 11, 24, 39, 42, 49, 52, 62 and 69. This is the same set of numbers that the player played in the first round of Keno game play, but a different set of numbers could be chosen by first touching Erase button 16. All Xs displayed in matrix 11 would disappear and the player would select new numbers to play by touching a new set of numbers in matrix 11. When the player has either selected up to ten new numbers or reused their former set of ten numbers and wants to continue game play they touch on-screen Start button 17.

Responsive to the touch of Start button 17 game computer 45 randomly selects and displays two sets of numbers. The first set is the three bonus numbers 18, 47 and 54 displayed as a B in a circle in matrix 11. The bonus numbers selected by game computer 45 are numbers other than those already chosen by the player in matrix 11. The second set of numbers selected by game computer 45 are the twenty randomly selected numbers that are displayed in display field 12 as shown in FIG. 5.

In the next step of the second round of Keno game play, game computer 45 performs two number comparisons. First, the computer compares the ten player selected numbers and the twenty numbers randomly selected by the game computer to determine any game winnings. In this second example of game play shown in FIG. 5 there are six matches for the numbers 42, 24, 39, 06, 69 and 11. The winnings are determined using pay table 18 with the number of number matches and the number of bets placed at the beginning of the second round of game play. In this second example of game play with six number matches and two bets placed the player wins twenty credits. The player started the second round of game play with 1006 credits and placed two bets equaling two credits, leaving 1004 credits. Having now won twenty credits the player's new credit total is 1024 credits.

The game computer 45 next compares the three bonus numbers 18, 47 and 54 with the twenty randomly selected numbers in display field 12 to determine if any bonuses are to be awarded to the player. The player is awarded a bonus because there are at least two number matches. In the round of game play shown in FIG. 5 there are matches for all three bonus numbers 18, 47 and 54. Responsive thereto the game computer 45 causes the row of ten numbers shown in FIG. 6A to appear on the video screen 10 underneath blocks 14 through 17. The size and type of the bonuses may be different between a match of two bonus number and three bonus numbers.

Due to all three bonus numbers matching ones of the twenty randomly selected numbers the game computer 45 causes a prompt "Please insert bonus ticket" to be displayed on-screen with the Keno game play screen requesting that the player insert a player selected bonus ticket that the player holds into ticket bar code reader 47 (FIG. 8) to be read and verified against an issued ticket data base. The prompt is displayed immediately beneath the player's Bet and Credit information as shown in FIG. 5. The player may choose to insert a bonus ticket they hold or not, at their discretion. If the player holds no bonus tickets they cannot insert one into ticket bar code reader 47. In that one instance the game computer knows that the player has no bonus tickets and automatically issues the player tickets for free games and a free game award multiplier. The player's actions for this second round of game play are described further in this Detailed Description.

At this point in game play the player only holds a bonus ticket for three free games and he/she inserts the ticket into ticket bar code reader 47 in FIG. 8. After the second round of game play is completed the player will receive three free rounds of subsequent Keno game play including the bonus feature.

Matches between these three bonus numbers and the twenty randomly selected numbers in display field 12 may be displayed in many ways on a video gaming machine but with the restriction of the drawing they are shown in bold circles. The number matches are shown as a dark circle around the number. To distinguish between player selected number matches and bonus number matches the bonus number matches, if any, blink while the player selected number matches are lit steady.

Figure 6A:
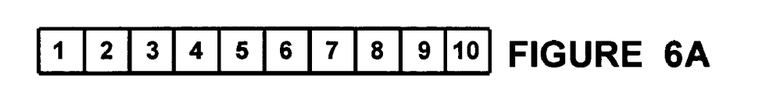
FIG. 6A shows a block of ten numbers displayed after there is a match of at least two of the twenty computer selected numbers and the three bonus numbers during a round of game play.
Figure 6B:
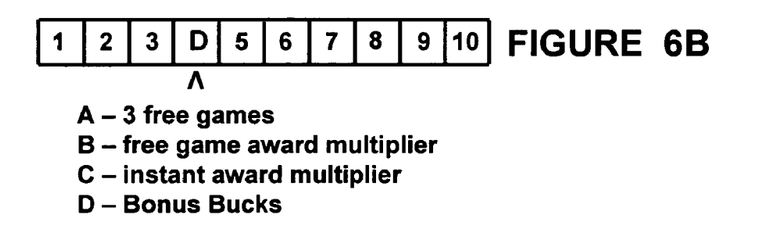
FIG. 6B shows what bonus a player receives responsive to selecting one of the ten num
Figure 7:
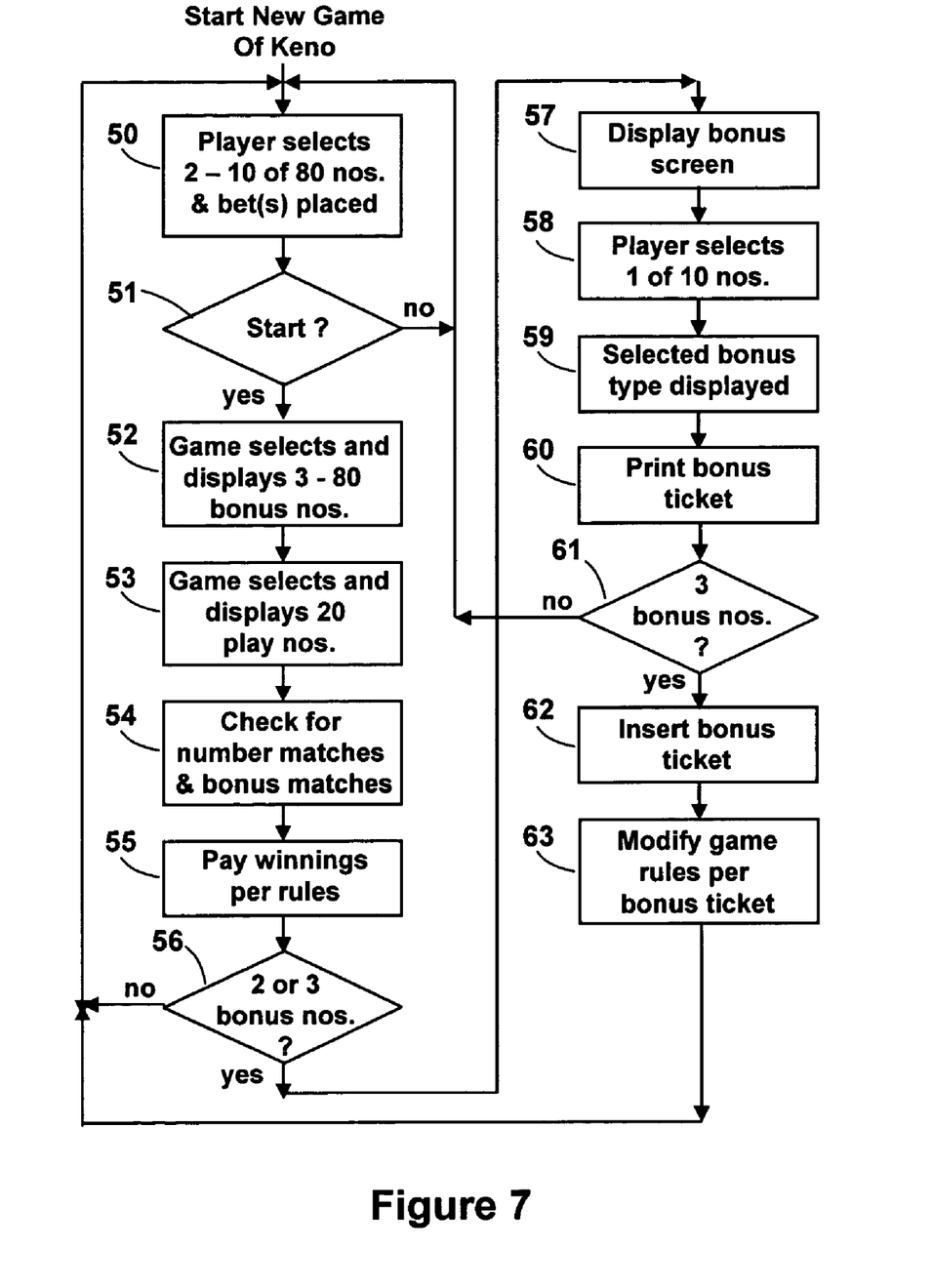
FIG. 7 shows a functional block diagram of the steps involved in the computer program used to implement Keno play with the present invention of bonus numbers.

The four types of bonuses are assigned to the ten numbers in FIG. 6A in the following manner. At the start of each round of Keno game play the game computer randomly selects one of the letters A through D to be associated with each of the numbers 1 through 10 in each of the ten blocks shown in FIG. 6A upon there being either two or three numbers matches of the three bonus numbers 18, 47 and 54. After the ten blocks with numbers shown in FIG. 6A are displayed on display screen 10 along with the Keno game display, the player selects and touches one of the ten number blocks. The touch is recognized by the touch screen and associated circuitry and software and the display changes to that shown in FIG. 6B. The number that has been touched disappears to display the previously randomly associated letter assigned to it. In FIG. 6B the number 4 has been touched by the player and the number 4 is replaced by the letter D. At the same time that the letter D is displayed in FIG. 6B, under the ten numbered blocks is displayed a description of each of the four possible bonuses and each is associated with one of the letters A through D. The bonus options have previously been described. There may be more than or fewer than four types of bonuses, and they may be different for two bonus number matches and three bonus number matches.

In this example of game play the letter D is the bonus letter behind the number 4 and the player is awarded a defined number of bonus bucks. The game computer 45 controls thermal printer 44 (FIG. 8) to print and dispense to the player a bonus ticket with alphanumeric printing and a bar code thereon indicating that the player has been awarded the defined number of bonus bucks. The second round of Keno game play is completed. Because the player inserted their bonus ticket for three free games game play will continue. Otherwise the player could have ceased game play until a later time. At that later time the player may recommence Keno game play and utilize any bonus tickets they hold at that time.

A player is only prompted to use their bonus tickets during a subsequent round of Keno game play when all three randomly selected bonus numbers in matrix 11 match ones of the twenty randomly selected numbers if display field 12. A player, at their option, may use any bonus ticket they hold when they are so prompted. This gives the player a feeling that they have some control in the game play. If there are no number matches, or only one or two bonus number matches, the player is not prompted on display screen 10 to insert a bonus ticket into ticket bar code reader 47. When a ticket is inserted into ticket bar code reader 47 it is read, verified and retained in reader 47 for subsequent disposal.

In this second example of Keno game play the letter D awards the player "Bonus Bucks". The use of Bonus Bucks has previously been described in reference to a side game of a horse race that is played following completion of the round of Keno game play during which the Bonus Bucks ticket was inserted into the ticket reader. The game computer 45 (FIG. 8) controls thermal printer 44 (FIG. 8) to print a bonus ticket with alpha-numeric information and a bar code thereon indicating that the player has won a Bonus Bucks bonus ticket. This is the end of the second round of game play.

Matches between the various sets of numbers may be displayed in many ways on a video gaming machine but with the restriction of the drawing they are shown in bold circles. The number matches are shown as a dark circle around the number. To distinguish between player selected number matches and bonus number matches the bonus number matches, if any, blink while the player selected number matches are lit steady.

In FIG. 8 is shown a functional block diagram of the steps involved in the software program used to implement the Keno game including the game bonus feature of the present invention. The game starts at block 50 awaiting a player to select between 2 and 10 of the eighty numbers in matrix 11 to be played and to place one or more bets on the outcome of the game. It is assumed that the number of Bets already displayed on screen are correct until the player touches one of buttons Bet Down 14 and Bet Up 15 to change the bets. The Keno game program waits for a player to touch ones of the eighty number positions in 8×10 matrix 11 indicating between two and ten player selected numbers they wish to play. As the player touches these numbers their selections are detected and the selected numbers are marked with an "X" in a circle as described with reference to FIG. 2. The player cannot select more than ten numbers. The player may use Erase button 16 to deselect all numbers and choose a new set.

At decision block 51 the program monitors if the player has touched Start button 17 indicating they are finished selecting up to ten numbers and has placed bet(s) and wants to continue game play. As long as Start button 17 is not touched the game software exits decision block 51 at No and cycles back to the input of block 50 to await the player to select additional numbers, change numbers, place bets or change bets. The player selected numbers are then marked with an X in a circle.

After the player indicates the start of game play by touching on screen Start button 17, at block 52 the game program randomly selects and displays the three bonus numbers in matrix 11. These are shown by the numbers marked with a "B" in a circle in FIGS. 3 and 5. Afterward, at block 53, the game program randomly selects and displays the twenty game play numbers shown in display field 12.

At block 54 the game program compares the twenty randomly selected numbers with the ten player selected numbers and the three bonus numbers for number matches. Any matches are indicated by a dark circle around the numbers in display field 12, and the bonus number matches are caused to blink to distinguish them from the other number matches.

At block 55 the game program pays the player any winnings based on the number of matches between the twenty randomly selected numbers and the ten player selected numbers per a pay table in a manner well known in the art.

At decision block 56 the game program determines if either two or three of the randomly selected bonus numbers match ones of the twenty randomly drawn game numbers in display field 12. If there are no matches or only one match, the player is awarded no bonus and the game program exits block 56 at "no" and cycles back to the input of block 51 to await the start of another round of Keno game play.

If at decision block 56 the game program determines that there are two or three bonus number matches the game program exits block 56 at "yes" and progresses to block 57 to display the bonus screen shown in FIGS. 4A and 6A. Other information, not shown, may also be displayed, such as bonus instructions. At block 58 the game program waits for and indicates one of the ten numbered blocks selected by the player as shown in FIGS. 4B and 6B. When the player has selected one of the ten bonus numbers by touching it on screen this is detected by the game program which then progresses to block 59 to display the type of bonus received by the player as indicated in and described with reference to FIGS. 4B and 6B.

At block 60 the game program controls thermal printer 44 in FIG. 8 to print a ticket on which are alphanumeric characters and a bar code indicating the type of bonus awarded to the player. In the first example of game play the player selected the number 8 behind which is the letter A indicating that the player has received three free games. This is shown in FIG. 4B. In the second example of game play the player selected the number 4 behind which is the letter D indicating that the player has received Bonus Bucks to be used in playing an alternate game. This is shown in FIG. 6B.

At decision block 61 the game program determines if all three randomly selected bonus numbers match ones of the twenty numbers randomly selected by the game program and displayed in display area 12. If the decision is no the program exits block 61 at "no" and returns to the input of block 51 to await the start of another round of game play of Keno. If the decision is yes the program exits block 61 at "yes" and progresses to block 62.

At block 62 the game program displays a message on the display screen 48 underneath the player's Bets and Credits instructing the player to insert a player selected one of their bonus tickets into bar code reader slot 47. At block 63 the game program causes the bar code on the inserted ticket to be read and modifies the game rules accordingly. In the first example the player received three free games which they can elect to play after they have all three bonus number matches. In the second example the player received Bonus Bucks which they can elect to play after they have all three bonus number matches.

Following this step the program progresses back to the input of block 50 to await the start of another round of Keno game play with modified game rules indicating whatever bonuses have been implemented at block 63.

In FIG. 8 is shown a functional block diagram of the electronic hardware used to implement a computer controlled implementation of the Keno video game incorporating the novel bonus awards teaching of the present invention. The heart of the computer controlled slot machine is a game computer 45 running the Keno program that is stored in memory 46. The basic operations of a Keno Game are well known in the art and are not repeated here for the sake of brevity. Responsive to the Keno game program game computer 45 causes a display on display 10, such as shown in FIGS. 1-5. Coupled with display 10 is touch screen 48 apparatus that is well known in the art and indicates to game computer 45 when and where a player has touched ones of the on-screen buttons displayed on display 10 as previously described.

The Nudge Keno video game may have a slot 47 with associated equipment for inserting and counting coins or tokens, and for accepting and reading a magnetic card to place a number of wagers or bets for each round of game play. In accordance with the teaching of the present invention a bar code reader is added with slot 47 to read the bar code on bonus tickets that are inserted. These monetary and reader functions are shown at the box entitled Money/Card Sensor/Bar Code Reader 47 which is connected to game computer 45 to receive indications of coin or token insertions, to read and write a debit card, and to read bonus tickets under the control of game computer 45. In reality there may be multiple slots for these functions. Also, when there is a slot for insertion of coins or tokens there will be a tray into which winnings in the form of coins or tokens are dispensed. This tray is shown as Payoff Device 49 which is controlled by game computer 45 to dispense winnings in the form of coins or tokens.

Using touch screen 48 game computer 45 monitors a player touching on-screen buttons described with reference to FIGS. 1-8 and responds accordingly to implement game functions as previously described.

There is also a thermal printer 44 that is controlled by game computer 45 and the game program to print out bonus tickets.

In some instances a player will be playing their first round of Keno game play and they will receive three matches between the three bonus numbers and the three numbers amongst the twenty numbers randomly chosen and displayed in display field 12. Normally the player would be prompted to insert a previously bonus ticket, but since the player has no bonus tickets they automatically receive a different type of bonus. They receive a fixed number of free Keno games and a fixed pay table multiplier for the free Keno games. The free games are started right after the first round of Keno game play is completed.

What has been described hereinabove are two examples of Keno game play per the preferred embodiment of the invention, it should be understood that numerous changes maybe made without departing from the spirit and scope of the invention. For example, many different types of bonus may be awarded to a player. The Bonus Bucks may be used to play any number of side games other than Keno. Further, the three bonus numbers may be matched against the ten player selected numbers. There may also be a different quantity of bonus numbers. Also, when bonus tickets may be inserted to receive the bonus indicated may vary. For example, a player may insert a free games bonus ticket or a free games award multiplier before the start of any round of game play.

The invention claimed is:

1. A method for playing a computer controlled video Keno game wherein for a first round of Keno game play a player places a bet and selects a first set of numbers to be played, a second set of numbers is randomly selected and displayed by the computer controlled game that are compared to the first set of player selected numbers to determine game winnings based on the number of matches between the first and second set of numbers, the bet placed and a pay table, wherein the improvement comprises the steps of:
   (a) the computer controlled game randomly selecting a third set of bonus numbers that are displayed;
   (b) comparing the third set of bonus numbers with the second set of numbers to determine a quantity of number matches;
   (c) awarding a bonus to the player when there are at least a first predetermined quantity of number matches in step (b),
   wherein the bonus awarded to the player can only be exercised during a subsequent round of game play;
   (d) wherein in the subsequent round of game play where the player selects a fourth set of numbers to be played, the computer controlled game randomly selecting and displaying a fifth set of numbers, wherein the bonus can only be exercised when there is at least a second predetermined quantity of number matches between the fourth set of numbers and the fifth set of numbers during the subsequent round of game play, wherein the second predetermined quantity of number matches is different than the first predetermined quantity of number matches.

2. The method for playing a computer controlled video Keno game in accordance with claim 1 wherein the bonus awarded to the player in step (c) is a first type of bonus selected by the player.

3. The method for playing a computer controlled video Keno game in accordance with claim 1 further comprising the step of:
   printing a bonus ticket and dispensing it to the player indicating the identity of the bonus awarded to the player in step (c);
   wherein a player inserts the bonus ticket into the computer controlled video Keno game at an appropriate time to exercise the bonus.

4. The method for playing a computer controlled video Keno game of claim 3 further comprising the steps of:
   prompting the player to insert a bonus ticket dispensed in a previous round of Keno game play when the quantity of number matches determined in step (d) exceeds the second predetermined quantity of number matches.

5. The method for playing a computer controlled video Keno game in accordance with claim 1 further comprising the step of:
   displaying a field of icons after it is determined in step (b) that the quantity of number matches between the third set of bonus numbers and the second set of numbers exceeds a second predetermined quantity of number matches, and each icon is randomly associated with a type of bonus, wherein one icon in the field of icons displayed in step (d) is selected by the player to identify the type of bonus awarded to the player in step (c).

6. The method for playing a computer controlled video Keno game of claim 1 further comprising the step of:
   permitting the player to exercise their bonus at a time that is dependent on the type of bonus.

7. The method for playing a computer controlled video Keno game of claim 1 wherein the second predetermined quantity of number matches exceeds the first predetermined quantity of number matches.

8. The method for playing a computer controlled video Keno game of claim 1 further comprising the step of:
   permitting the player to exercise their bonus at a time that is dependent on the type of bonus.

* * * * *